Figure 1:
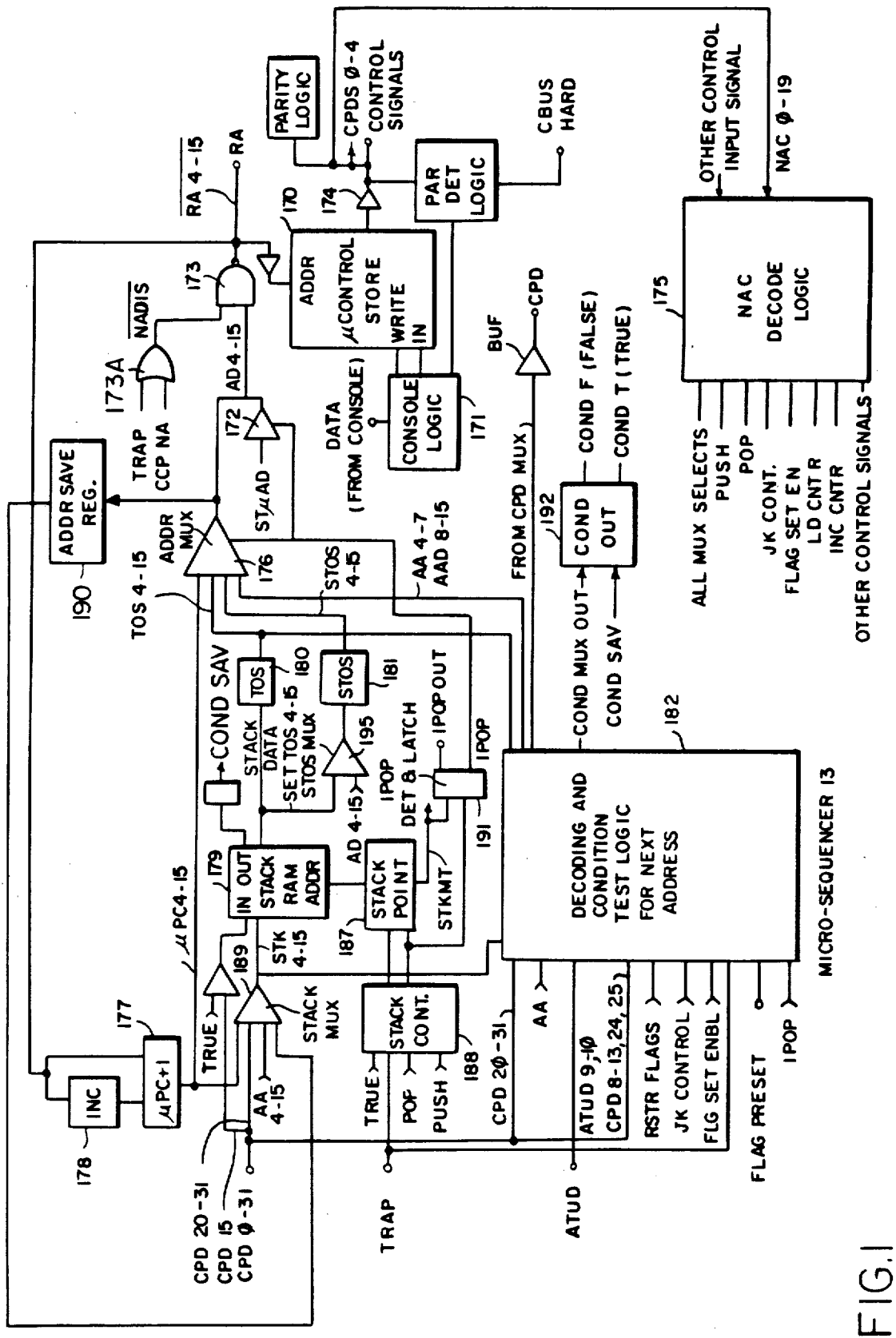

United States Patent [19]

Epstein et al.

[11] Patent Number: 4,679,138
[45] Date of Patent: Jul. 7, 1987

[54] MICROSEQUENCER IN A DATA PROCESSING SYSTEM USING STACK STORAGE FOR CONTROLLING THE SEQUENCING OF MICROROUTINES

[75] Inventors: David I. Epstein, Framingham; Charles J. Holland, Northboro, both of Mass.

[73] Assignee: Data General Corporation, Westboro, Mass.

[21] Appl. No.: 256,714

[22] Filed: Apr. 23, 1981

[51] Int. Cl.[4] .............................................. G06F 9/22
[52] U.S. Cl. ................................................... 364/200
[58] Field of Search ... 364/900 MS File, 200 MS File

[56] References Cited

U.S. PATENT DOCUMENTS 4,080,648  3/1978  Asano et al. ...................... 364/200
4,118,776  10/1978  Isomura ............................. 364/200
4,159,520  6/1979  Prioste .............................. 364/200
4,176,394  11/1979  Kaminski et al. ................. 364/200

Primary Examiner—Thomas M. Heckler
Attorney, Agent, or Firm—Robert F. O'Connell

[57] ABSTRACT

A data processing system in which macroinstructions are decoded to provide a sequence of microinstructions comprising one or more microroutines. A stack storage means stores data for use in such microroutines. The final microinstruction of the microroutines is a request to retrieve or remove data from the stack. When no data is present therein (the stack is empty) a new macroinstruction is requested and when data is present in the stack the microroutine returns to another mircoroutine in which it is acting as a micro-subroutine to permit continuation of the other microroutine.

8 Claims, 3 Drawing Figures

| MICRO-CYCLES: | 1 | 2 | 3 | 4 | ... | i+3 | i+4 | .. | p+3 | p+4 | .. | n+3 | n+4 | n+5 |
|---|---|---|---|---|---|---|---|---|---|---|---|---|---|---|
| MICRO-INSTR. | A | B | C | T(1) *1* | ... *1* | T(i) CTXL | *2* | .. | T(p) LPOP | *3* | .. | T(n) REST | C | D |
| TRAP | | | ^ | | | | | .. | | | .. | | | |
| SAVE REG. | A | B | C | D | D | D | *4* | .. | T(p) | | .. | T(n) | C | D |
| STOS REG. | - | - | - | D | D | D | | .. | | D | .. | D | D | |
| STACK | x1 x2 x3 | x1 x2 x3 | x1 x2 x3 | C x1 x2 x3 | C x1 x2 x3 | C x1 x2 x3 | D C x1 x2 x3 | .. | D C x1 x2 x3 | C x1 x2 x3 | .. | C x1 x2 x3 | x1 x2 x3 | |

*1*   any micro-order except CTXL or LPOP but stack operations allowed only in complementary form and in PUSH POP order to insure that the stack returns to its original state

*2*   any micro-order but stack operations allowed only in complementary form and in PUSH POP order to insure that the stack returns to its original state

*3*   any micro-order except LPOP but stack operations allowed only in complementary form and in PUSH POP order to insure that the stack returns to its original state

*4*   SAVE reg. will restart 1 cycle later but is not valid until cycle T(i+2) at which time it will contain the address T(i+2)

FIG. 3

MICROSEQUENCER IN A DATA PROCESSING SYSTEM USING STACK STORAGE FOR CONTROLLING THE SEQUENCING OF MICROROUTINES

INTRODUCTION

This invention relates generally to data processing systems in which microroutines comprising sequences of microinstructions are generated from decoded macroinstructions and, more particularly, to unique methods for beginning and ending such microroutines.

BACKGROUND OF THE INVENTION

A data processing system which utilizes microinstructions conventionally requires appropriate control of the sequencing of the microinstructions which are generated as a result of the decoding of a macroinstruction.

A particular system for providing control of such sequencing operation (a "microsequencing" process) is illustrated in copending U.S. patent application Ser. No. 143,710, filed Apr. 25, 1980 by C. J. Holland et al., in which a decoded macroinstruction provides the starting address of a sequence of one or more microinstructions representing a microroutine. The starting address is supplied to a unique microinstruction sequencing unit, in the system described therein, which unit appropriately decodes a selected field of each microinstruction for determining the address of the next successive microinstruction, the address being suitably selected from a plurality of microaddress sources. An exemplary overall configuration in which such a microsequencer is utilized is described in the above-referenced application and such application is, accordingly, incorporated by reference herein.

As described in the aforesaid application, the entire microinstruction set for the system is loaded into a microcontrol store means, e.g., a random access memory (RAM), and the starting address of a particularly sequence thereof is supplied from a suitable instruction processor unit which decodes a macroinstruction for such purpose. The microsequencer unit then must determine the next address required for each sequential microinstruction (if any) via appropriate decoding of a "next address control" field of the current microinstruction. An address multiplexer unit is utilized to select the source of the address for the next sequential microinstruction, such microaddress being obtained from one of a number of different sources, e.g., from an incremented micro-program counter unit, from a temporary storage of microaddresses for a particular microcode routine which are stored in a stack RAM unit, from an address which has been accessed from the stack and saved in a previous operation, from an address which is supplied from a source external to the microsequencer unit itself, from an absolute address supplied externally via a dispatch multiplexer, as discussed in the aforesaid Holland et al. application.

In performing microroutines it is often necessary to use sub-routines which are common to many main microroutines and to have such sub-routines readily available so that the microprogram can jump thereto and return to the next step in the main routine with no problem. In most conventional sequencing operations, only certain sub-routines may be set up as common sub-routines, so that the main microroutines must always include appropriate instructions for jumping to the sub-routine and for subsequently returning to the main microroutine when the latter indicates the subroutine operation has been completed. In general the sub-routine merely indicates, in effect, that it is "DONE" and the microprogrammer then must arrange the sub-routine to permit a return to the appropriate sequence of microinstructions in the main microroutine.

In contrast to such conventional microinstruction sequencing control operation, it is desirable that all microcode routines be utilizable, in effect, as microcode sub-routines when appropriate and that all such microroutines be capable of either returning a new macroinstruction (and, hence, a new microroutine) automatically without the need for special instructions therefor.

BRIEF SUMMARY OF THE INVENTION

In the microinstruction sequencing control technique in accordance with the invention, all microroutines are effectively set up and can be classified both as a main microroutine (if it is a routine which is executing a macroinstruction in its entirety) or as a micro-subroutine (if it is a routine which is only a part of the entire macroinstruction execution). The last microinstruction of all such microroutines provides the capability for accessing a new macroinstruction (i.e., providing an automatic indication that the particular routine is acting in effect as a main microroutine and has been completed) or provides a return to another microroutine, in which that particular microroutine is acting as a microsubroutine, the return being made to the appropriate microaddress in the calling microroutine to permit continuation thereof. Such operation is achieved by utilizing a stack RAM, shown in the previously referred-to application of Holland et al. and supplying a microroutine return which always requires the contents of such stack to be accessed. If access to the stack shows that the stack is empty, such indication is used to initiate a request for a new macroinstruction. If access to the stack shows that the stack is not empty then it contains the address of the next microinstruction of the calling microroutine which then automatically resumes its operation at the micro-address indicated by the top entry of the stack.

The unique technique for starting and ending microroutines is discussed in more detail below.

DESCRIPTION OF THE INVENTION

Figure 2:
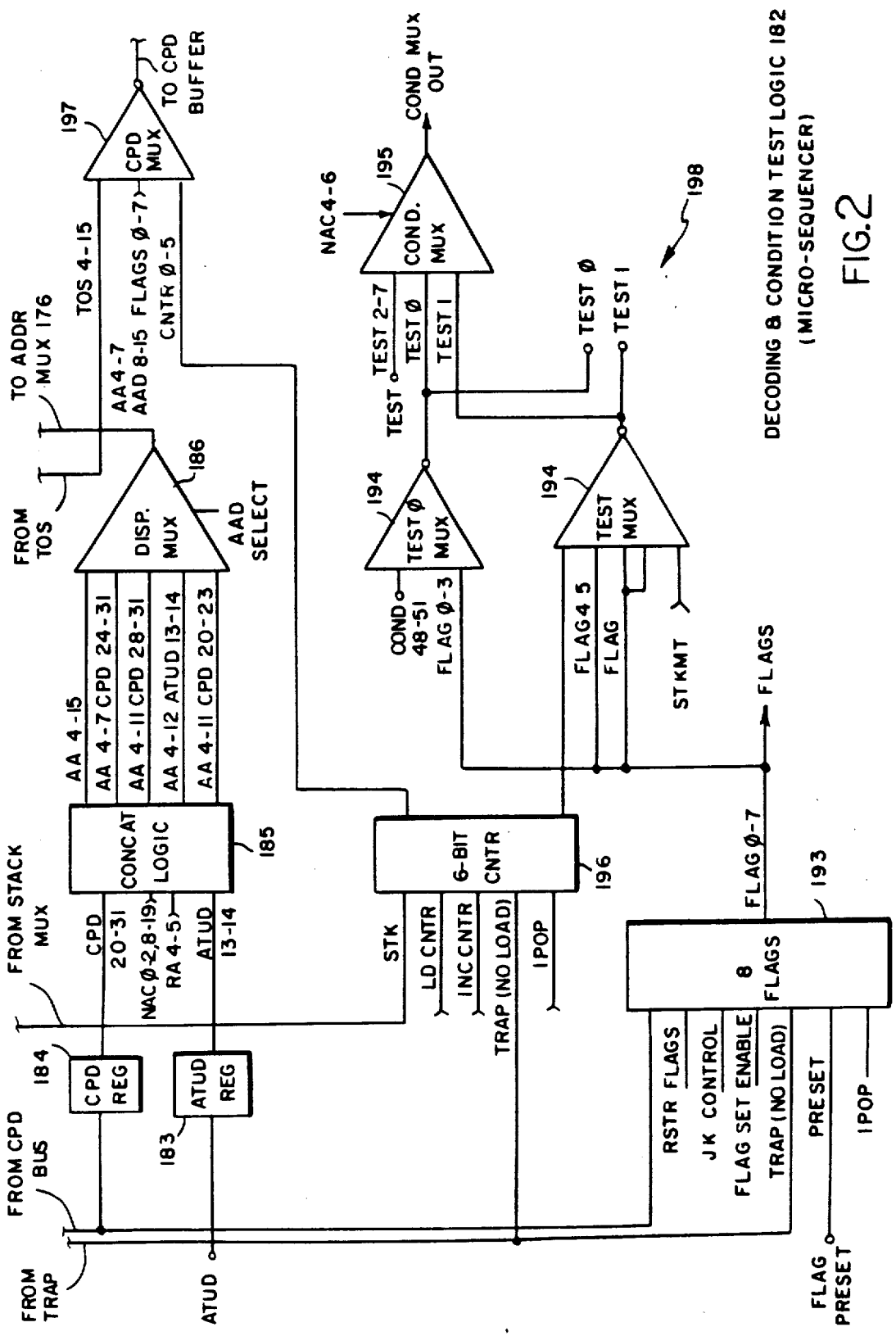

The invention can be described in more detail with the help of the accompanying drawings wherein FIGS. 1 and 2 show a block diagram of the microsequencer unit in accordance with the invention; and FIG. 3 shows a chart which describes a particular example of a fault interrupt operation in accordance with the invention.

The microsequencer unit of the system described in the above-referenced application of Holland et al. is shown in FIGS. 1 and 2 which are the same as FIGS. 137 and 138 of such application. The overall operation thereof is described in the aforesaid application, incorporated herein by reference, and need not be repeated in its entirety here.

As can be seen in FIG. 1, the microsequencer unit includes a stack RAM 179 which contains data which is temporarily stored for use in a particular microroutine, for example. The data is stored ("pushed") onto the stack in sequence so that the last data placed therein is the first data which can be removed therefrom so that, in a data retrieval from stack RAM 179, the data at the top of the stack (TOS) is retrieved first. When data at the top of the stack is removed and all of the remaining data moves up in the stack by one position so that the data which was at the level below the top of the stack is now at the top of the stack, such operation is termed a "pop" (or "popping") of the stack. When data is retrieved from the top of the stack and such data is not removed from the stack but remains at the top thereof, such operation is not deemed a "pop" operation.

When a particular microroutine is completed, the data stored therein for that particular microroutine has been completely retrieved therefrom and the stack is empty. As the final step in all microroutines, in accordance with the invention, the top of the stack is always popped. A STKMT signal indicating that the stack is empty is produced by the stack pointer logic unit 187. The output from stack controller 188, indicating that a request has been made to pop the stack, and the STKMT signal from the stack point logic 187, indicating that no data is in the stack, thereby produces an IPOP signal at the output of IPOP detector and latch logic 191 which transmitted to the instruction processor unit via IPOP OUT ( as discussed in the aforesaid application) to request the starting microaddress of a new macroinstruction indicating that the microroutine implementing the previous macroinstruction has been completed.

If the stack pointer logic 187 does not produce a STKMT signal at its output at the end of a particular microroutine (because data is still present in the stack RAM 179), a return will be made from the particular microroutine which was being performed (acting in effect as a sub-routine) to another calling microroutine so that the latter microroutine can continue. The latter microroutine will proceed through its own sequence, or will use other intermediate sub-routines during such sequence, until the final step of the effective main microroutine, such last step (as in all microroutines as mentioned above) being a request to pop the stack. If the main microroutine is completed, such pop request, as mentioned above, will essentially require the popping of an empty stack so that a STKMT signal will be generated, thereby producing an IPOP OUT signal for the instruction processor which requests the starting microaddress of a new macroinstruction. Thus, all microroutines are arranged to have as the last step in their sequence a stack pop request instruction and only when the stack is empty will a request for a new macroinstruction be generated, otherwise a microroutine will automatically return to another microroutine for which it is in effect acting as a subroutine. Accordingly, all microroutines are effectively treated as sub-routines and all microroutines can be either used as an effective main microroutine or called by any other microroutine for use as a sub-routine.

With reference to the fault interrupt (or "trap") operations, FIG. 1 is useful in explaining the operations which will occur when a fault is detected.

During a microroutine the microsequencer unit always computes the address of the next microinstruction to be executed while the current microinstruction information has been latched by those entities in the system which utilize the appropriate parts of such microinstruction supplied from the microcontrol store 170. Thus, the current microistruction is accessed from the microcontrol store 170 and supplied to whatever units of the overall system are required for the use thereof during the next microinstruction operating cycle. It is during the latter cycle that the address of the subsequent microinstruction of the sequence to be executed is computed, as discussed in the aforesaid Holland et al. application.

The address of the current microinstruction is always stored in the address save register 190 during the cycle in which the next microinstruction is fetched from the microcontrol store 170. If a problem, or fault, occurs in the system a TRAP signal (also termed a NO LOAD signal) is generated by suitable trap hardware so as to abort the particular microcycle in which the current microinstruction is being executed. The address of the microinstruction which has been aborted is in the address save register 190, as mentioned above, and is then pushed onto the top of the stack 179 via stack multiplexer 189. The next address of the suspended sequence (currently on lines AD4-15) is placed in the save-top-of-stack register (STOS) 181 via STOS multiplexer unit 195 during the current microinstruction and, as explained above, such address is placed in the address save register 190. Thus, at the beginning of the next cycle (the first cycle of the TRAP sequence) the aborted address is at the top of the stack 179 while the next address is saved in both the address save register 190 and the STOS register 181. The save register is then prohibited from clocking in any new data.

A particular trap-handling microroutine must then be utilized to determine the cause of the TRAP so that appropriate action can be taken by the system. Thus, at a TRAP indication the first microinstruction of the trap-handler microroutine must be obtained at a suitable address in the microcontrol store 170. This address (sometimes termed a "phantom" address) is obtained externally at the RA bus rather than from the AD4-15 lines, the presence of the TRAP signal preventing the address bits AD4-15 from being applied to the microcontrol store 170, via appropriate logic, such as representatively shown in FIG. 1 by units 173 and 173-A, so that the externally supplied phantom address bits $\overline{RA4\text{-}15}$ can be so supplied.

In accordance with the selected trap-handler microroutine, a decision is made either to immediately resolve the fault which caused the TRAP, to resolve it over a longer period of time before returning to the microcode routine which was being performed at the time the TRAP occurred, or to completely abort the microroutine. For example, the TRAP situation may merely be one in which one or more data words are being retrieved from a cache memory of the system which contains blocks of data words. If a portion of a data word being retrieved is contained in one cache block and the remainder of the word is contained in a second cache block, a "cache block crossing" condition occurs. Since the data portions as retrieved will be in an incorrect order, they must be returned and appropriately re-ordered into the correct data word format. The latter operation can be performed by an appropriate microroutine and in order to do so a TRAP (NO LOAD) signal is generated by suitable hardware to interrupt the current microroutine so that the fault (in this case a cache block crossing fault) can be identified and the microroutine for handling such fault can be called to resolve the fault effectively immediately, after which the interrupt returns to the interrupted microinstruction of the current microroutine.

Alternatively, the TRAP handler microroutine may determine that the cause of the TRAP is such that more time is required before a return can be made to the microcode routine. In the latter case the TRAP handler microroutine may cause the contents of all of the registers of the overall system to be appropriately saved (sometimes referred to as a "context" save operation). In such case, in addition to saving the contents of selected system registers, the state of the microsequencer unit, including the contents of the stack, is also saved. The system operation is suspended indefinitely with respect to the particular interrupted microroutine which was being performed. When preparing to return to the interrupted microroutine, the system register and the state of the microsequencer are restored. Such a situation may occur, for example, if a "page fault" occurs, e.g., where the current microinstruction calls for a page in memory which is not resident in main memory at the time.

In some cases, faults are of the type which cannot be resolved and, in effect, require a permanent abort of the microroutine which is being performed. In such cases a fault resolution is not performed. In all cases the identification of the particular fault and the appropriate handling thereof can be suitably determined by software, firmware and/or hardware as desired for any particular system, such determination would be within the skill of the art for any particular system and does not form a part of the invention, per se.

In the first instance above, wherein the trap-handler microroutine determines that the fault can be resolved substantially immediately and the system returned to the currently aborted microroutine without the necessity for interrupting the routine indefinitely, the trap-handler microroutine supplies a conditional restore (REST) instruction, which condition must test "false" once the trap-handler microroutine has been completed with respect to the particularly identified fault. The REST instruction is described below:

| Mnem. | Explanation | True Action | False Action |
|---|---|---|---|
| REST | If FALSE: Restore after context | $\mu PC \leftarrow PC + 1$ | $\mu PC \leftarrow TOS$ pop stack |
| CONDITIONAL CONTEXT RESTORE MICRO-ORDERS | | | |

As can be seen, a restore (REST) signal is conditional and permits a continuation to the next microaddress of the trap-handler microroutine immediately without restoring if the condition tests "true" but can permit the restoration of interrupted microinstruction if the condition tests "false". Such condition is determined by condition logic 192 of FIG. 2 which supplies a TRUE signal (condition T) or a FALSE signal (condition F).

Under a "false" condition, the restore operation permits the microsequencer to access the microcontrol store 170 at the aborted microaddress which has been saved at the top of the stack after which the stack is popped and the address save register is restarted so to be ready in case another TRAP situation occurs. In the next microcycle, while the aborted microinstruction is resumed, the microsequencer forces the next microaddress, which had been previously saved in STOS register 181, to be applied to the microcontrol store 170 to obtain the next logical microinstruction. Because the next microaddress has already been saved in STOS register 181, it is available immediately and does not have to be regenerated by the next address control field of the originally aborted microaddress. The microroutine thereupon continues in its fully normal sequence.

If the trap-handler microroutine determines that an indefinite interrrupt must occur, then there must be mechanisms for saving the information which is in stack 179 and the information in the STOS register 181 so that they can be restored when the fault has been resolved. The following instructions in the traphandler microroutine are provided for such purpose. Such instructions, known as the context leap (CTXL) and leap and pop (LPOP) instructions, are described below.

| Mnem. | Description | Actions | |
|---|---|---|---|
| CTXL | Context Leap | $\mu PC \leftarrow AA(12)$; | Push and restart SAVE |
| LPOP | Leap and Pop | $\mu PC \leftarrow AA(12)$; | STOS -TOS Pop stack |
| UNCONDITIONAL CONTEXT RESTORE MICRO-ORDERS | | | |

The context leap (CTXL) instruction pushes the contents of the address save register save register 190 onto the stack which contains the microaddress logically following the interrupted microinstruction in that microroutine. The trap-handler routine then, by saving the stack, assures that the state of the microsequencer required to restore the aborted microroutine at some future time is available. The leap and pop (LPOP) instruction provides for the loading of the STOS register 181 from the stack 179 when preparing to restore the aborted microroutine since the integrity of the STOS register is required for the REST microcode to be effective.

When it is desirable to save the entire state of the system, so that another process can be started or continued while the fault for the currently aborted microroutine is resolved, a capability for saving the current state of all system registers and restoring them when the interrupted microroutine begins again is required. Between the context leap instruction in which the contents of the address save register 190 are pushed onto the stack and the leap and opo instructions wherein the STOS register 181 is loaded from the stack in preparation for a restore operation, essentially anything can be executed by the overall system, including the execution of those micro-orders which permit the state of the system to be saved and restored. Since the LPOP instruction simply puts the top of the stack into the STOS register only at the time of the LPOP instruction, the STOS register can be loaded prior to such instructions as many times as desired. Only the last load of the STOS is effective so that the contents thereof (the top of the stack) at that time will be used by the restore (REST) microinstruction to restore the interrupted microroutine correctly.

The trap-handler microroutine can take any one of three basic forms: the short form, used when it is desired to return to normal microcode flow as soon as possible; the long form which will provide the necessary functions to prepare for a context state save operation so as to allow for a departure from the microcode flow for a long time; or a non-restore form which is used when it is desirable to abort the process that caused the trap and never return to the particular microcode routine which was aborted.

FIG. 3 shows a chart which describes, as an example, the long form trap-handler operation. The first cycle of the trap-handler microroutine is identified as "cycle 1" in FIG. 3 and the last cycle is defined as "cycle n". The cycles "i" and "p" are intermediate cycles which contain the context leap (CTXL) and leap and pop (LPOP) micro-orders.

Thus, in the example of FIG. 3 it is assumed that a microroutine is being performed which includes microinstructions A, B, C, D . . . etc. During a particular microinstruction cycle the address of the microinstruction which is currently being performed is stored in the address save register 190. For example, in cycle 1 microinstruction A is being executed and is being utilized to obtain a microaddress for microinstruction B. The SAVE register contains the microaddress of microinstruction A during its execution. The stack contains appropriate data for use in such microinstruction (arbitrarily designated as x1, x2 and x3). The next address in the microroutine is shown as the address of microinstruction B. During the second cycle microinstruction B is executed and its address is saved in address save register 190, while the next address, that of microinstruction C, is being generated. The same data is being utilized in the stack.

During microcycle 3 a TRAP condition occurs. Microinstruction C was the current microinstruction which was being executed, so address C was saved in address save register 190. During microcycle 3 the phantom address of the trap-handler microroutine T(1) is placed on the RA bus to direct the system to the initial address of the trap-handler microroutine. Microcycle 3 completes by no-loading all system registers. During microcycle 4 the aborted address C is placed at the top of the stack and the address of the next microinstruction D is placed in the address save register 190 and in the STOS register 181.

The trap-handler microroutine performs its pre-programmed operation between cycle 4 and cycle (n+3). During cycle (i+3) the CTXL instruction is utilized wherein the contents of the address save register (address D) is pushed onto the stack 179 so that such address is at the top of the stack during the cycle (i+4). Thus, at that stage the aborted address C has been placed next to the top of the stack, while the top of the stack contains the address of next logical instruction of the interrupted microroutine. As mentioned above, the system registers and the contents of the stack now may be saved to allow completely different processing operations to be performed. When preparing to return to the interrupted microroutine, the contents of the system registers and the stack must then be restored.

The occurrence of the LPOP instruction (at cycle p+3) causes such next address at the top of the stack to be loaded into the STOS register 181 (at cycle p+4). The originally aborted microaddress C is then at the top of the stack so that at the time of the restore (REST) instruction at cycle (n+3), of the trap-handler microroutine, the top of the stack can be supplied to the microcontrol store 170 to obtain microinstruction C (the microaddress of microinstruction C, according to normal operation, would then be placed in the address save register 190 to prepare for another possible TRAP situation, as before).

The saved contents of the registers at the time of the originally aborted microroutine would then all have been restored and the microroutine again proceeds in sequence to that at cycle (n+5) microinstruction D, whose address is forced from the STOS by the REST microaddress, is executed.

In summary, during a "short form" trap (where the fault can be resolved substantially immediately with no "context save" required) a REST operation is required, but no CTXL or LPOP operation is required. During a "long form" (where the fault cannot be resolved immediately and requires an indefinite interrupt and where a "context save" may be required) CTXL and LPOP operations are required and are followed by a REST operation (as illustrated in the example of FIG. 3). In a complete abort trap (where the fault cannot be resolved and the entire microroutine must be aborted) a CTXL operation followed by two stack pop operations are required. The CTXL starts up the ADDR SAVE register 190 to prepare for another trap and the two stack pop operations remove the microaddresses that were placed on the stack by the TRAP and CTXL microcycles. Thus, no microaddresses are available to continue the original microroutine and such microroutine is effectively aborted.

The microsequencer system of the invention as set forth in the foregoing description operates, first of all, to provide a unique technique for automatically starting and ending all microroutines, which routines are all treated either as effective main microroutines or as effective sub-routines. In this way the need for special instructions for such starting and ending operations is avoided. Further, the system avoids the necessity for providing a condition test for all microinstructions which are likely to be subject to a fault, and permits faults to be treated in a way which is not visible to the microprogram.

What is claimed is:

1. In a data processing system having macroinstruction decodeing means for decoding a macroinstruction to provide a sequence of microinstructions comprising one or more microroutines, a microsequencing control means for controlling the provision of said sequence of microinstructions, said microsequencing control means including stack storage means for temporarily storing data for use in said microroutines, the final microinstruction of a microroutine being a request to retrieve or remove data from said stack storage means;

first logic means connected to said stack storage means and responsive to the data request of the final microinstruction of a microroutine for producing a stack empty signal when no data remains in said storage means; and second logic means connected to said first logic means and responsive to said stack empty signal and to said data request for generating an output signal for requesting a new macroinstruction.

2. In a data processing system in accordance with claim 1 wherein said first and second logic means are responsive to the data request from the final microinstruction of a microroutine for permitting a return to another microroutine in which it is acting as a microsubroutine to permit a continuation of said other microroutine when data remains in said stack storage means.

3. In a data processing system in accordance with claims 1 or 2 wherein said stack storage means is a random-access-memory stack storage means.

4. In a data processing system in accordance with claim 3 wherein said stack storage means stores data therein in a sequence having a top and a bottom so that data stored at the top of the stack sequence can be retrieved or removed therefrom before retrieving the remaining data of the stack sequence.

5. In a data processing system in accordance with claim 4 wherein said first logic means includes means for pointing to a location of the data which is stored at the top of said stack sequence to permit retrieval or removal thereof if data is present thereat or to provide said stack empty signal if data is not present thereat.

6. A method for use in a data processing system having macroinstruction decoding means for decoding a macroinstruction to provide a sequence of microinstructions comprising one or more microroutines, said method comprising temporarily storing data for use in said microroutines in a storage means;

requesting a retrieval or removal of data from said storage means as the final microinstruction of a microroutine; and requesting a new macroinstruction when said request indicates that no data is present in said storage means.

7. A method in accordance with claim 6 and further including providing an output signal indicating that the storage means is empty when no data is present therein, said new macroinstruction being requested when said output signal is so provided.

8. A method in accordance with claim 6 and further including returning to another microroutine when the request for retrieval or removal of data from said storage means indicates that data is present in said storage means.

* * * * *